US012718828B2

(12) United States Patent
Usher

(10) Patent No.: US 12,718,828 B2
(45) Date of Patent: Aug. 25, 2026

(54) AUDIO SOURCE CLASSIFICATION FOR HANDSFREE COMMUNICATIONS

(71) Applicant: Synaptics Incorporated, San Jose, CA (US)

(72) Inventor: John Usher, Berlin (DE)

(73) Assignee: Synaptics Incorporated, San Jose, CA (US)

( * ) Notice: Subject to any disclaimer, the term of this patent is extended or adjusted under 35 U.S.C. 154(b) by 182 days.

(21) Appl. No.: 18/185,977

(22) Filed: Mar. 17, 2023

(65) Prior Publication Data

US 2024/0312472 A1 Sep. 19, 2024

(51) Int. Cl.

*G10L 21/02* (2013.01)
*G10L 21/0208* (2013.01)
*G10L 21/034* (2013.01)
*G10L 25/27* (2013.01)

(52) U.S. Cl.

CPC .............. *G10L 21/02* (2013.01); *G10L 25/27* (2013.01)

(58) Field of Classification Search

None

See application file for complete search history.

(56) References Cited

U.S. PATENT DOCUMENTS 8,239,196 B1 * 8/2012 Paniconi ............. G10L 21/0216 704/226
9,008,329 B1 * 4/2015 Mandel .................. G10K 15/00 704/226
11,114,108 B1 * 9/2021 Maalouli ................ H04R 3/005
2015/0071461 A1 * 3/2015 Thyssen .............. G10L 21/0208 381/94.1
2016/0162844 A1 * 6/2016 Rachuri ............. G06Q 10/1093 705/7.19

FOREIGN PATENT DOCUMENTS

CN 113611318 A * 11/2021

OTHER PUBLICATIONS

Meier et al., "Relative Impulse Response Estimation During Doubletalk with an Artificial Neural Network-Based Step Size Control", 2016, IEEE (Year: 2016).*
Li et al., "Relationship between speech recognition in noise and sparseness", 2011, International Journal of Audiology (Year: 2011).*
Cui et al., "A robust TDOA estimation method for in-car-noise environments", 2014, ISCA (Year: 2014).*

* cited by examiner

*Primary Examiner* — Pierre Louis Desir
*Assistant Examiner* — Cody Douglas Hutcheson
(74) *Attorney, Agent, or Firm* — Paradice & Li LLP

(57) ABSTRACT

This disclosure provides methods, devices, and systems for audio signal processing. The present implementations more specifically relate to speech enhancement techniques that utilize multi-channel audio signals for audio source classification. In some aspects, a speech enhancement system may include an adaptive filter, a feature extractor, and a feature classifier. The adaptive filter is configured to receive a multi-channel audio signal, via at least a first microphone and a second microphone, and determine a relative impulse response (ReIR) between the microphones based on the multi-channel audio signal. The feature extractor is configured to extract a set of features from the ReIR based at least in part on a peak of the ReIR. The feature classifier is configured to classify the set of features as being associated with a target source or a distractor source based on a Gaussian mixture model (GMM).

13 Claims, 10 Drawing Sheets

AUDIO SOURCE CLASSIFICATION FOR HANDSFREE COMMUNICATIONS

TECHNICAL FIELD

The present implementations relate generally to signal processing, and specifically to audio source classification for handsfree communications.

BACKGROUND OF RELATED ART

Telephonic communication devices include microphones configured to convert sound waves into audio signals that can be transmitted, over a communications channel, to a receiving device. The audio signals often include a target speech component (such as from a user speaking in a direction of the communication device) and a noise component (such as from people speaking in the background). Speech enhancement is a signal processing technique that attempts to suppress the noise component of the received audio signals without distorting the target speech component. Multi-channel speech enhancement relies on spatial diversity in audio signals received via an array of microphones (also referred to as "multi-channel audio signals") to separate the speech component from the noise component. By contrast, single-channel speech enhancement must track the noise component in audio signals received via a single microphone (also referred to as "single-channel audio signals").

Some telephonic communication devices (such as voice over Internet protocol (VoIP) phones) include multiple microphones that can be selectively activated for a particular mode of operation. For example, many VoIP phones include a base that can be used for "handsfree calling" (where audio signals are received via a microphone in the base) and a detachable handset that can be separated from the base for "handset calling" (where audio signals are received via a microphone in the handset). Most handsets are designed to rest on the base (such as in a "cradle") when the phone is used for handsfree calling. While in the cradle, the microphone in the handset is often obstructed by the base. Thus, many existing telephonic communication devices rely only on single-channel audio signals for handsfree calling.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes steps of receiving a multi-channel audio signal via a plurality of microphones; determining a relative impulse response between the plurality of microphones based on a frame of the multi-channel audio signal; extracting a set of features from the relative impulse response based at least in part on a peak of the relative impulse response; classifying the set of features based on a Gaussian mixture model (GMM); and processing the multi-channel audio signal based at least in part on the classification for the set of features.

Another innovative aspect of the subject matter of this disclosure can be implemented in a speech enhancement system, including a processing system and a memory. The memory stores instructions that, when executed by the processing system, cause the speech enhancement system to receive a multi-channel audio signal via a plurality of microphones; determine a relative impulse response between the plurality of microphones based on a frame of the multi-channel audio signal; extract a set of features from the relative impulse response based at least in part on a peak of the relative impulse response; classify the set of features based on a GMM; and process the multi-channel audio signal based at least in part on the classification for the set of features.

BRIEF DESCRIPTION OF THE DRAWINGS

The present implementations are illustrated by way of example and are not intended to be limited by the figures of the accompanying drawings.

DETAILED DESCRIPTION

Figure 1:
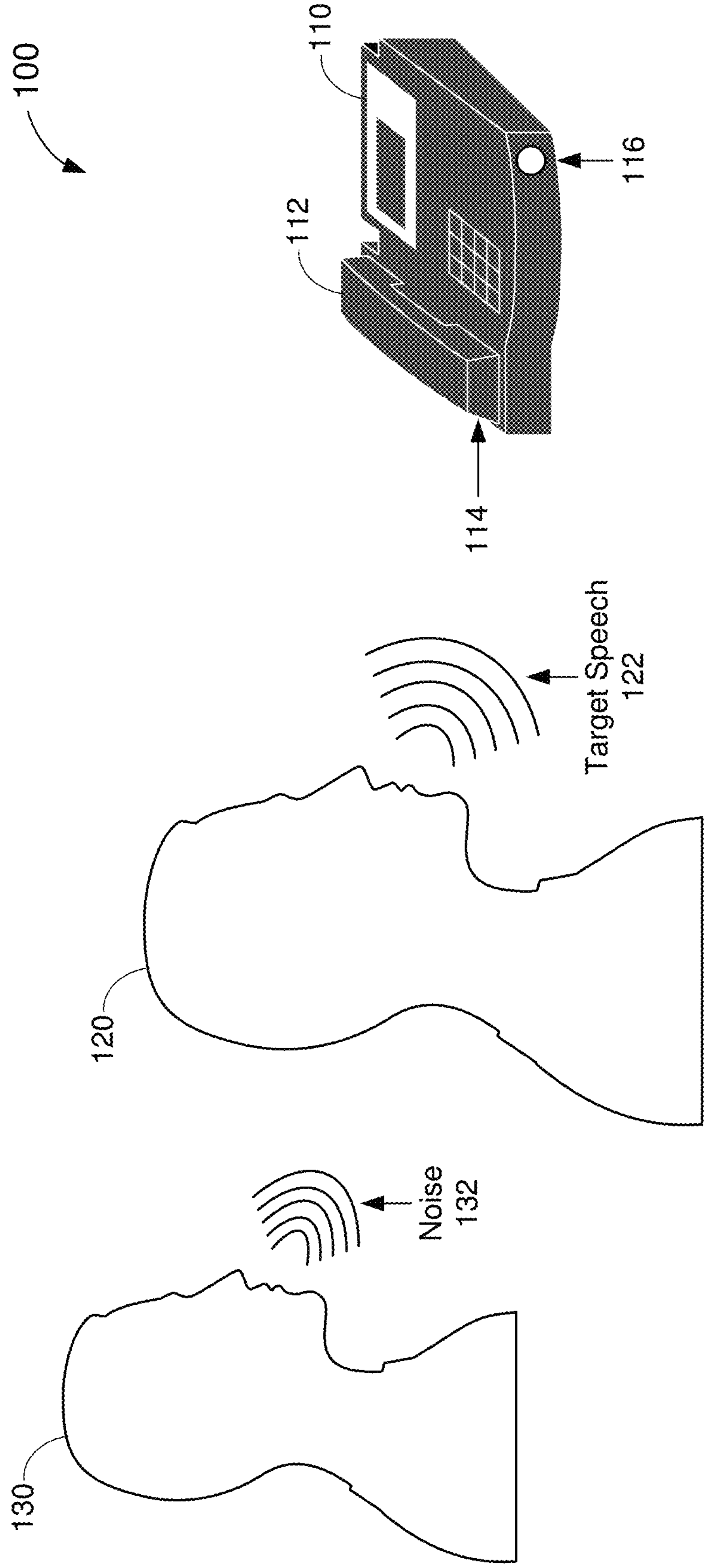
FIG. 1 shows an example environment for which speech enhancement may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, some telephonic communication devices (such as voice over Internet protocol (VoIP) phones) include multiple microphones that can be selectively activated for a particular mode of operation. For example, many VoIP phones include a base that can be used for "handsfree calling" (where audio signals are received via a microphone in the base) and a detachable handset that can be separated from the base for "handset calling" (where audio signals are received via a microphone in the handset). Most handsets are designed to rest on the base (such as in a "cradle") when the phone is used for handsfree calling. While in the cradle, the microphone in the handset is often obstructed by the base.

However, aspects of the present disclosure recognize that the handset microphone can still produce usable audio signals when the telephonic communication device is used for handsfree calling (even if the sound waves are obstructed by the base). More specifically, the audio signals received via the handset microphone (also referred to as "handset audio signals") can be combined with audio signals received via the base microphone (also referred to as "handsfree audio signals"), for example, to produce a multi-channel audio signal that can be used to discriminate between portions of the audio signal originating from a target source (such as a user of the communication device) and portions of the audio signal originating from a distractor source (such as people speaking in the background or various other sources of noise).

Various aspects relate generally to audio signal processing, and more particularly, to speech enhancement techniques that utilize multi-channel audio signals for audio source classification. In some aspects, a speech enhancement system may include an adaptive filter, a feature extractor, and a feature classifier. The adaptive filter is configured to receive a multi-channel audio signal, via at least a first microphone and a second microphone, and determine a relative impulse response (ReIR) between the microphones based on the multi-channel audio signal. The feature extractor is configured to extract a set of features from the ReIR based at least in part on a peak of the ReIR. In some implementations, the set of features may include a kurtosis of a tail portion of the ReIR, where the tail portion spans a threshold duration starting from the peak. In some other implementations, the set of features may include a root mean square (RMS) of a pre-ring portion of the ReIR normalized with respect to the peak, where the pre-ring portion spans a threshold duration ending at the peak. The feature classifier is configured to classify the set of features as being associated with a target source or a distractor source based on a Gaussian mixture model (GMM).

Particular implementations of the subject matter described in this disclosure can be implemented to realize one or more of the following potential advantages. By utilizing multiple microphones for handsfree communications, aspects of the present disclosure can leverage spatial diversity in the received audio signals to enhance the user experience or sound quality of handsfree communications. For example, the speech enhancement system may "focus in" on the target source by applying a gain to the handsfree audio signal based on the output of the feature classifier. More specifically, the system may apply a higher gain to emphasize or amplify portions of the audio signal having the target source classification and apply a lower gain to suppress or attenuate portions of the audio signal having the distractor source classification. Thus, the speech enhancement techniques of the present implementations may be referred to herein as "handsfree speaker focus" (HSF). Although specific examples are described with reference to a telephonic communication system having a handset and a base, the audio source classification techniques of the present implementations may be used for various other forms of speech enhancement in any audio communication system with multiple microphones.

FIG. 1 shows an example environment 100 for which speech enhancement may be implemented. The example environment 100 includes a telephonic communication device 110, a user 120 of the communication device 110 (also referred to as a "target audio source" or "target source"), and a speaker 130 in the background (also referred to as a "distractor audio source" or "distractor source"). In some aspects, the telephonic communication device 110 may include a handset 112 and a base (depicted as the remainder of the communication device). More specifically, the handset 112 includes a handset microphone 114 and the base includes a base microphone 116.

In the example of FIG. 1, the telephonic communication device 110 is shown to operate in a "handsfree mode," with the handset 112 resting in a cradle on the base. In some implementations, the telephonic communication device 110 may be configured to turn on or otherwise activate the handset microphone 114 and the base microphone 116 when operating in the handsfree mode. As such, each of the microphones 114 and 116 may detect acoustic waves, including target speech 122 and noise 132, propagating through the environment 100. For example, the target speech 122 may include any sounds produced by the user 120. By contrast, the noise 132 may include any sounds produced by the background speaker 130 or any other sources of background noise (not shown for simplicity).

Each of the microphones 114 and 116 may convert the detected acoustic waves to an electrical signal (also referred to as an "audio signal") representative of the acoustic waveform. Accordingly, each audio signal may include a speech component (representing the target speech 122) and a noise component (representing the noise 132). Due to the spatial positioning of the microphones 114 and 116, sounds detected by one of the microphones 114 or 116 may be delayed relative to the sounds detected by the other microphone. In other words, the microphones 114 and 116 may produce audio signals with varying phase offsets. In some implementations, the sounds detected by the handset microphone 114 may be attenuated or otherwise distorted compared to the sounds detected by the base microphone 116 due to the position of the handset 112 on the base.

Aspects of the present disclosure recognize that the audio signals received via the handset microphone 114 (also referred to as "handset audio signals") can be used to enhance the quality of audio signals received via the base microphone 116 (also referred to as "handsfree audio signals") during handsfree calling. In some implementations, the telephonic communication device 110 may leverage the spatial diversity between the handsfree audio signals and the handset audio signals to discriminate between portions of the audio signals containing target speech 122 and portions of the audio signals containing only noise 132. The telephonic communication device 110 may further improve the quality of speech in a handsfree audio signal, for example, by processing the portions of the audio signal that contain target speech 122 differently than the portions of the audio signal that contain only noise 132.

Figure 2:
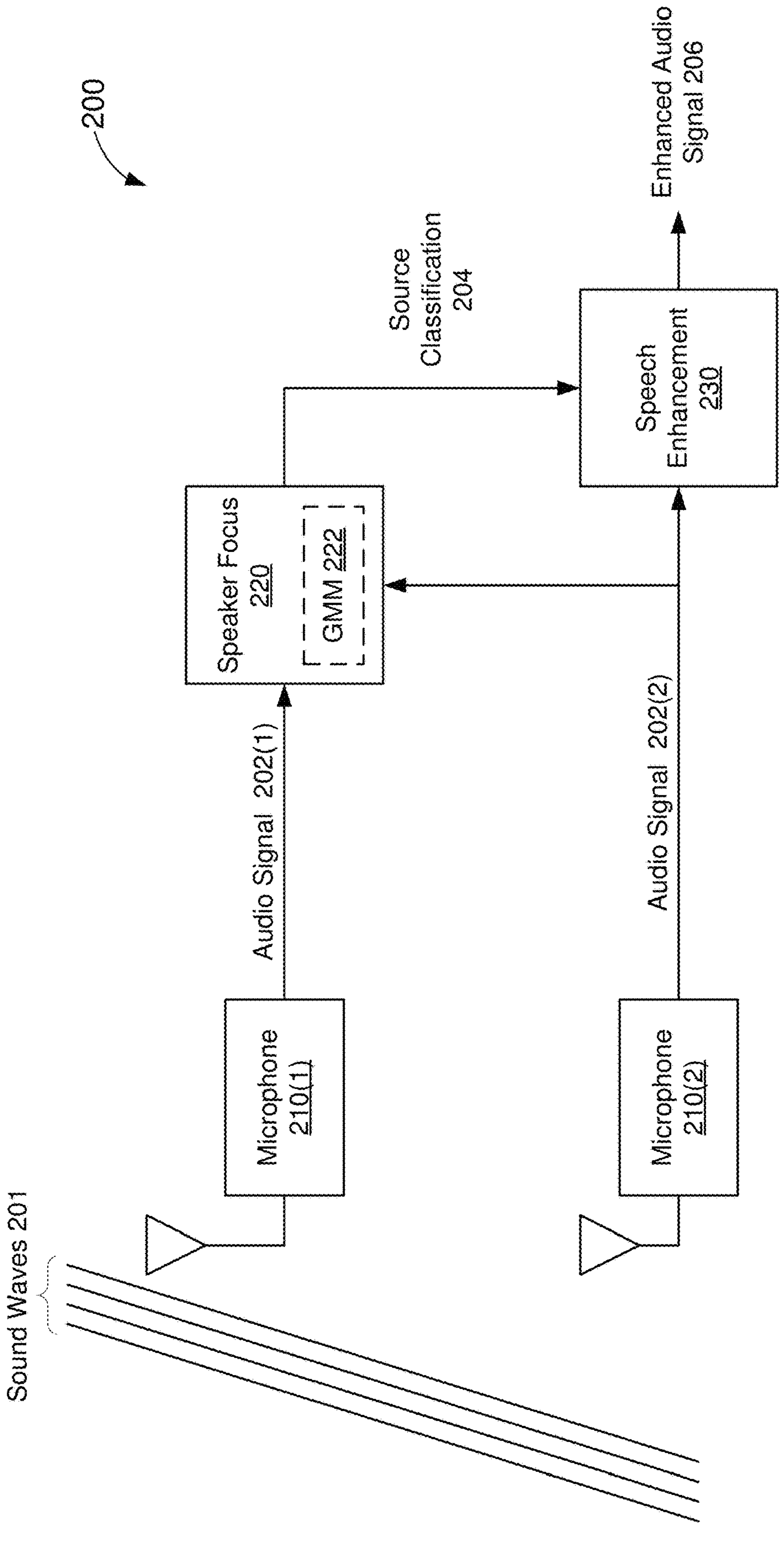
FIG. 2 shows an example audio receiver that supports speech enhancement.

FIG. 2 shows an example audio receiver 200 that supports speech enhancement. The audio receiver 200 includes multiple microphones 210(1) and 210(2), a speaker focus component 220, and a speech enhancement component 230. In some implementations, the audio receiver 200 may be one example of the telephonic communication device 110 of FIG. 1. With reference for example to FIG. 1, the first microphone 210(1) may be one example of the handset microphone 114 and the second microphone 210(2) may be one example of the base microphone 116.

The microphones 210(1) and 210(2) are configured to convert a series of sound waves 201 (such as the acoustic waves of FIG. 1) into audio signals 202(1) and 202(2), respectively. In some implementations, the sound waves 201 may include user speech (such as the target speech 122) mixed with background noise or interference (such as the noise 132). Thus, each of the audio signals 202(1) and 202(2) may include a speech component and a noise component. More specifically, each of the audio signals 202(1) and 202(2) may represent a respective channel of a multichannel audio signal. Due to the spatial positioning of the microphones 210(1) and 210(2), the audio signal 202(2) may be a delayed version of the audio signal 202(1). In some other implementations, the audio signal 202(1) may be a delayed version of the audio signal 202(2). Still further, in some implementations, there may be no delay between the audio signals 202(1) and 202(2).

The speaker focus component 220 is configured to determine a respective source classification 204 based on each frame of the multi-channel audio signal. For example, the source classification 204 may indicate whether the respective frame of the multi-channel audio signal contains target speech or noise only. In some aspects, the speaker focus component 220 may determine a relative impulse response between the microphones 210(1) and 210(2) based on the audio signals 202(1) and 202(1). In some implementations, the speaker focus component 220 may determine the source classification 204 based on one or more properties of the relative impulse response. For example, the speaker focus component 220 may extract a set of features from the relative impulse response and classify the set of features as originating from a target source (such as the user 120) or a distractor source (such as the background speaker 130). In some implementations, the speaker focus component 220 may perform the feature classification based, at least in part, on a Gaussian mixture model (GMM) 222.

The speech enhancement component 230 is configured to produce an enhanced audio signal 206 based on the audio signal 202(2) and the source classification 204. More specifically, the speech enhancement component 230 may improve the quality of speech in the audio signal 202(2) by suppressing or attenuating noise or otherwise increasing the signal-to-noise ratio (SNR) of the audio signal 202(2) based, at least in part, on the source classification 204. In some aspects, the speech enhancement component 230 may apply a gain to the audio signal 202(2) based on the source classification 204. In some implementations, the speech enhancement component 230 may apply a higher gain to pass-through or amplify a given frame of the audio signal 202(2) when the source classification 204 indicates that the frame contains target speech. In some other implementations, the speech enhancement component 230 may apply a lower gain to suppress or attenuate a given frame of the audio signal 202(2) when the source classification 204 indicates that the frame contains only noise.

Figure 3:
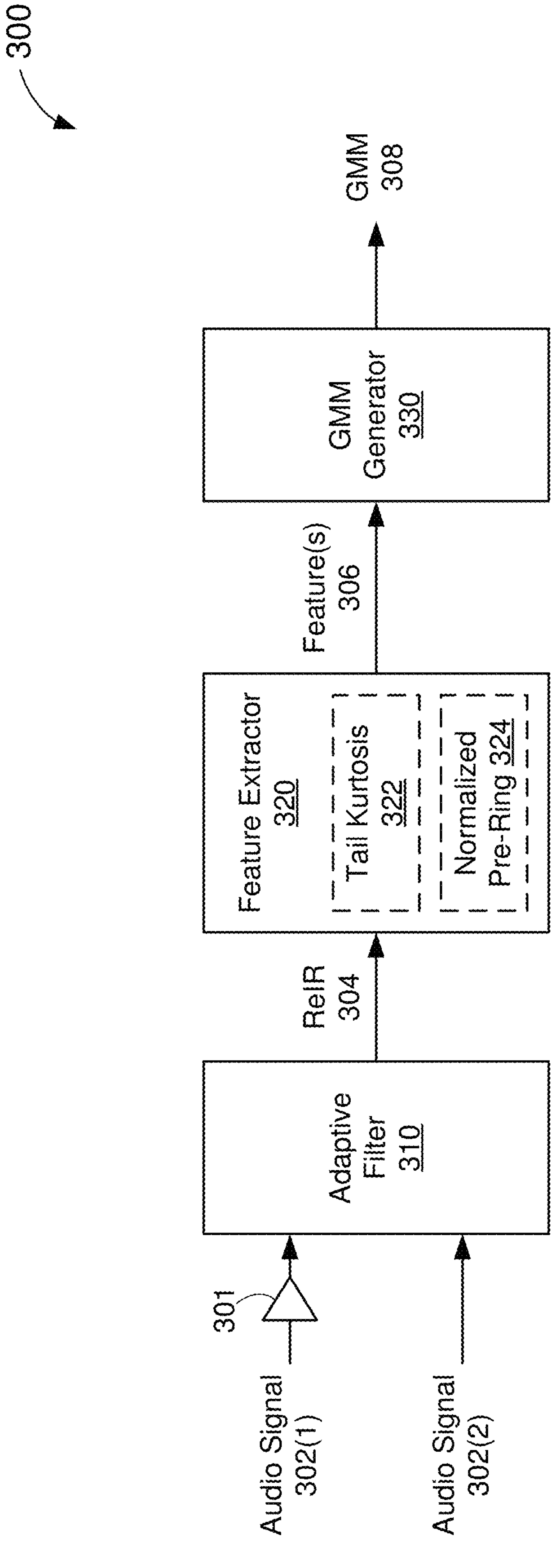
FIG. 3 shows a block diagram of an example Gaussian mixture model (GMM) training system, according to some implementations.

FIG. 3 shows a block diagram of an example Gaussian mixture model (GMM) training system 300, according to some implementations. The GMM training system 300 is configured to train or otherwise generate a GMM 308 that can be used to classify features extracted from a relative impulse response. With reference for example to FIG. 2, the GMM 308 may be one example of the GMM 222. In some implementations, the GMM training system 300 may be one example of the speaker focus component 220. In such implementations, the speaker focus component 220 may train the GMM 222 based on speech from a user of the audio receiver 200.

In some aspects, the GMM training system 300 may train the GMM 308 based on audio signals 302(1) and 302(2) received via respective microphones (not shown for simplicity). With reference for example to FIG. 2, the audio signal 302(1) may be one example of the audio signal 202(1) and the audio signal 302(2) may be one example of the audio signal 202(2). In some implementations, a delay 301 may be applied to the audio signal 302(1).

In some other implementations, a delay may instead be applied to the audio signal 302(2) rather than the audio signal 302(1). Still further, in some implementations, no delay may be applied to any of the audio signals 302(1) or 302(2). In some implementations, each of the audio signals 302(1) and 302(2) may be processed via a quadrature mirror filter (QMF) which splits each audio signal into at least 2 sub-bands (not shown for simplicity). In such implementations, the GMM training system 300 may process each of the sub-bands individually (as separate input audio signals).

The GMM training system 300 includes an adaptive filter 310, a feature extractor 320, and a GMM generator 330. The adaptive filter 310 is configured to determine a relative impulse response (ReIR) 304 between the microphones based on the received audio signals 302(1) and 302(2). Example suitable adaptive filtering techniques include frequency-domain normalized least mean squares (NLMS), time-domain NLMS, affine projection, and recursive least mean squares (LMS), among other examples.

In some implementations, the adaptive filter 310 may determine the ReIR 304 based on a frequency-domain NLMS filter. For example, the adaptive filter 310 may convert each frame of the audio signals 302(1) and 302(2) from the time domain to the frequency domain (such as by using a fast Fourier transform (FFT)) and determine an NLMS filter that matches a frame of the audio signal 302(1) to a respective frame of the audio signal 302(2). The resulting NLMS filter is a mechanical-acoustical transfer function that represents the ReIR 304 (when converted to the time domain) between the microphones with respect to a source of the audio signals 302(1) and 302(2).

The feature extractor 320 is configured to extract a set of features 306 from the ReIR 304 based, at least in part, on a location of the peak of the ReIR 304 (such as where the amplitude of the ReIR 304 is highest). For example, the location of the peak of the ReIR 304 may be aligned with the timing of the delay 301. In some implementations, the delay 301 may be equal to one quarter of the NLMS filter size. In some aspects, the feature extractor 320 may determine the set of features 306 based on one or more statistical properties of the ReIR 304. Example suitable statistical properties include a kurtosis of the ReIR 304, a root mean square (RMS) of the ReIR 304, and a skew or level of the ReIR 304, among other examples.

In some implementations, the feature extractor 320 may include a tail kurtosis component 322. The tail kurtosis component 322 is configured to determine a kurtosis of a tail portion of the ReIR 304 (also referred to as the "tail kurtosis"). For example, the kurtosis of a random variable (X) is defined as:

$$\mathrm{Kurt}[X] = E\left[\left(\frac{X-\mu}{\sigma}\right)^4\right] = \frac{E\left[(X-\mu)^4\right]}{\left(E\left[(X-\mu)^2\right]\right)^2} = \frac{\mu_4}{\sigma^4} \tag{1}$$

where $\mu_4$ is the fourth central moment and $\sigma$ is the standard deviation. The tail portion of the ReIR 304 spans a threshold duration starting from the peak of the ReIR 304. In some implementations, the tail portion of the ReIR 304 may include the remainder of the ReIR 304 (from the peak of the ReIR 304 to the end of the ReIR 304).

In some implementations, the feature extractor 320 may include a normalized pre-ring component 324. The normalized pre-ring component 324 is configured to determine an RMS of a pre-ring portion of the ReIR 304 normalized with respect to the peak of the ReIR 304 (also referred to as the "normalized pre-ring"). For example, the RMS of a waveform (f(t)) defined over an interval $T_1 \le t \le T_2$ is:

$$f_{RMS} = \sqrt{\frac{1}{T_2 - T_1}\int_{T_1}^{T_2}[f(t)]^2 dt} \tag{2}$$

The pre-ring portion of the ReIR 304 spans a threshold duration ending at (or just before) the peak of the ReIR 304. In some implementations, the pre-ring portion of the ReIR 304 may span a portion of the ReIR 304 from the beginning of the ReIR 304 to one or more samples (such as 5) before the peak of the ReIR 304.

The set of features 306 may include the tail kurtosis of the ReIR 304, the normalized pre-ring of the ReIR 304, or any combination thereof. In some implementations, the set of features 306 may include other statistical properties of the ReIR 304 (not shown for simplicity). Example suitable statistical properties may include, among other examples, the skew or level of the entirety of the ReIR 304 or the skew or level of a portion of the ReIR 304 (such as the pre-ring portion or the tail portion).

The GMM generator 330 accumulates the features 306 over a threshold number (N) of frames of the audio signals 302(1) and 302(2) and generates the GMM 308 based on the accumulated features 306. In some implementations, a user may be instructed to provide target speech samples (such as by speaking in a direction of the microphones) during the accumulation interval. After N sets of features 306 are accumulated, the GMM generator 330 may determine a GMM that is fitted to one or more clusters of the accumulated features 306. For example, the GMM generator 330 may perform the fitting using the expectation-maximization (EM) algorithm.

In some implementations, the GMM generator 330 may draw confidence ellipsoids for multivariate models and compute the Bayesian information criterion to assess the number of clusters associated with the accumulated features 306. At least one of the clusters may be labeled a target cluster (associated with the target source) and at least one of the clusters may be labeled a distractor cluster (associated with a distractor source). In some other implementations, the GMM generator 330 may be tuned or otherwise configured to determine 2 non-covariate clusters, including a target cluster and a distractor cluster. In some aspects, the mean and variance of each cluster may be stored as the GMM 308. In some other aspects, the GMM 308 also may include the covariance for each cluster.

Figure 4:
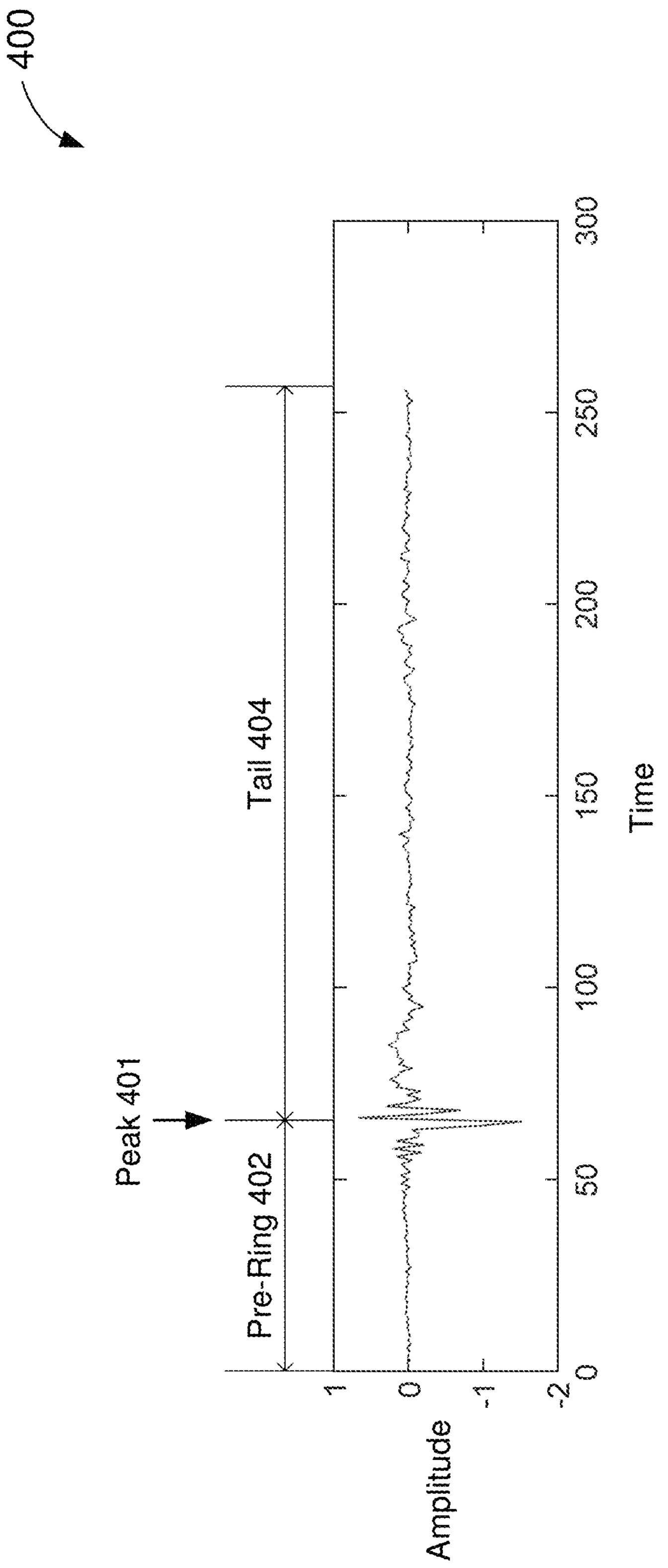
FIG. 4 shows a timing diagram depicting an example relative impulse response (ReIR) between a pair of microphones.

FIG. 4 shows a timing diagram depicting an example relative impulse response (ReIR) 400 between a pair of microphones. In some implementations, the ReIR 400 may be produced by an adaptive filter (such as the adaptive filter 310 of FIG. 3) based on a pair of audio signals received via the pair of microphones, respectively. In the example of FIG. 4, the amplitude of the ReIR 400 is depicted over time (T). More specifically, the ReIR 400 spans a duration from times T=0 to T=256 and has a peak 401 that occurs around time T=63. In some implementations, the duration of the ReIR 400 may be subdivided into a pre-ring portion 402 and a tail portion 404. The pre-ring portion 402 spans a duration starting from the beginning of the ReIR 400 and terminating at or just before the peak 401. The tail portion 404 spans a duration starting from the peak 401 and terminating at the end of the ReIR 400.

Figure 5:
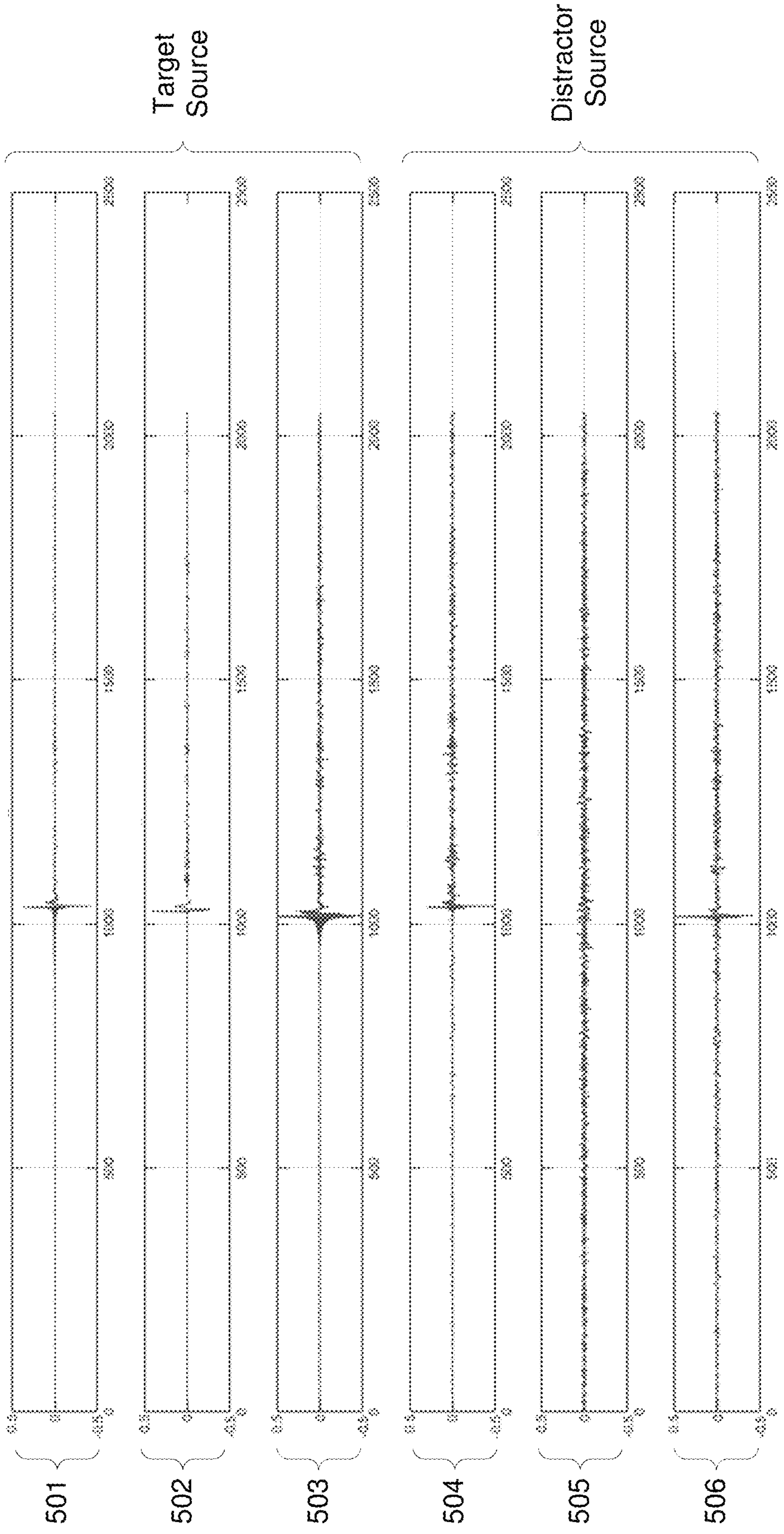
FIG. 5 shows timing diagrams depicting example ReIRs with respect to target and distractor sources.

FIG. 5 shows timing diagrams 501-506 depicting example ReIRs with respect to target and distractor sources. In some implementations, each of the ReIRs 501-506 may be produced by an adaptive filter (such as the adaptive filter 310 of FIG. 3) based on a pair of audio signals received via a pair of microphones, respectively. In the example of FIG. 5, the ReIRs 501-503 are determined based on audio frames containing target speech. As such the ReIRs 501-503 are said to originate from a target source. By contrast, the ReIRs 504-506 are determined based on audio frames that only contain noise. As such, the ReIRs 504-506 are said to originate from a distractor source.

Aspects of the present disclosure recognize that ReIRs originating from sources farther from the microphones (such as a distractor source) tend to have noisier tails than ReIRs originating from sources closer to the microphones (such as a target source). As shown in FIG. 5, the tail portions of the ReIRs 504-506 that originate from a distractor source are generally noisier than the tail portions of the ReIRs 501-503 that originate from a target source. For example, each of the ReIRs 504-506 may have a tail kurtosis close to 3 (which is the kurtosis of random noise). By contrast, each of the ReIRs 501-503 may have a tail kurtosis much higher than 3. Accordingly, a higher tail kurtosis may indicate that an ReIR is more likely to originate from a target source whereas a lower tail kurtosis may indicate that an ReIR is more likely to originate from a distractor source.

Aspects of the present disclosure also recognize that ReIRs originating from sources farther from the microphones (such as a distractor source) tend to exhibit more pre-ringing that ReIRs originating from sources closer to the microphones (such as a target source). As shown in FIG. 5, the pre-ring portions of the ReIRs 504-506 that originate from a distractor source generally exhibit more ringing than the pre-ring portions of the ReIRs 501-503 that originate from the target source. As such, each of the ReIRs 504-506 may have a relatively high normalized pre-ring. By contrast, each of the ReIRs 501-503 may have a relatively low normalized pre-ring. Accordingly, a higher normalized pre-ring may indicate that an ReIR is more likely to originate from a distractor source whereas a lower normalized pre-ring may indicate that an ReIR is more likely to originate from a target source.

Figure 6:
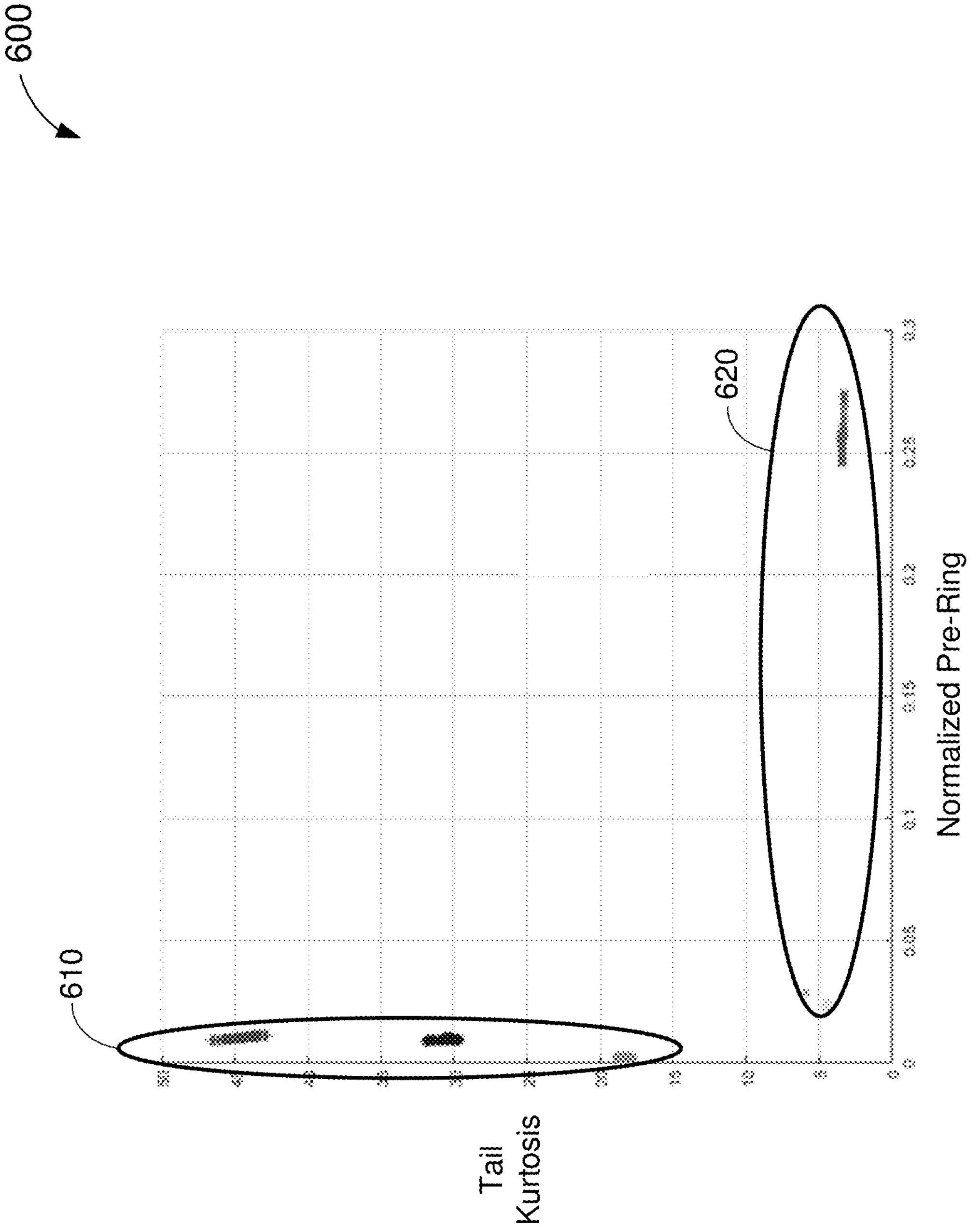
FIG. 6 shows an example Gaussian mixture model (GMM) that can be generated from a set of features extracted from an ReIR.

FIG. 6 shows an example GMM 600 that can be generated from a set of features extracted from an ReIR. In some implementations, the GMM 600 may be produced by a GMM generator (such as the GMM generator 330 of FIG. 3) based on features extracted from ReIRs. In the example of FIG. 6, the GMM 600 is depicted as a pair of ellipsoids 610 and 620 each fitted to a respective cluster of data points. Each data point represents a set of features extracted from a respective ReIR. More specifically, each feature set includes a tail kurtosis of the ReIR (mapped along the vertical axis) and a normalized pre-ring of the ReIR (mapped along the horizontal axis).

As shown in FIG. 6, data points belonging to the first cluster 610 have a relatively high tail kurtosis and relatively low normalized pre-ring. By contrast, data points belonging to the second cluster 620 have a relatively low tail kurtosis and a relatively high normalized pre-ring. As described with reference to FIG. 5, higher tail kurtosis may indicate that an ReIR is more likely to originate from a target source whereas higher normalized pre-ring may indicate that an ReIR is more likely to originate from a distractor source. Thus, in some implementations, the first cluster 610 may be labeled a "target cluster" and the second cluster 620 may be labeled a "distractor cluster." In other words, data points belonging to the target cluster 610 represent ReIRs that are determined to originate from a target source. By contrast, data points belonging to the distractor cluster 620 represent ReIRs that are determined to originate from a distractor source.

Figure 7:
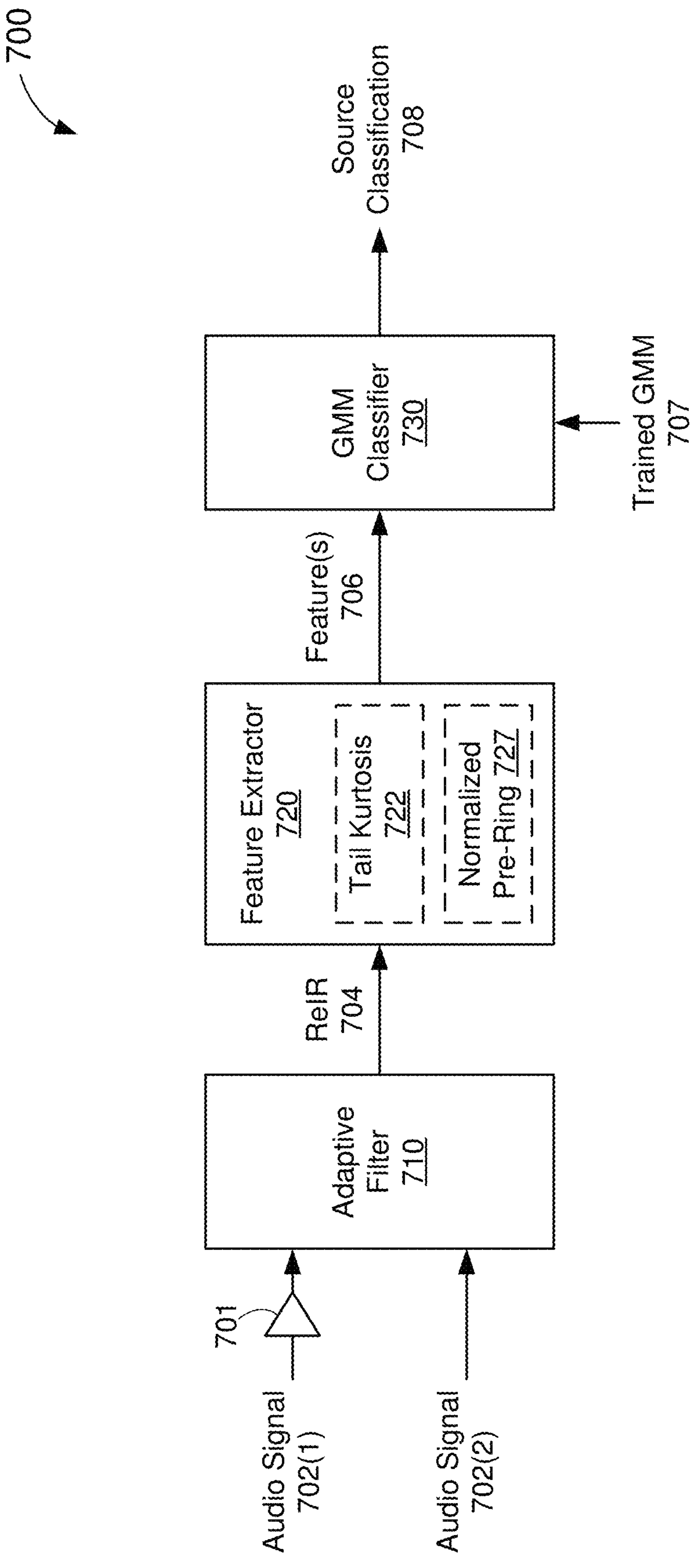
FIG. 7 shows a block diagram of an example speaker focus classification system, according to some implementations.

FIG. 7 shows a block diagram of an example speaker focus system 700, according to some implementations. In some implementations, the speaker focus system 700 may be one example of the speaker focus component 220 of FIG. 2. More specifically, the speaker focus system 700 is configured to determine a respective source classification 708 based on each frame of a multi-channel audio signal.

In the example of FIG. 7, the multi-channel audio signal may include audio signals 702(1) and 702(2) received via respective microphones (not shown for simplicity). With reference for example to FIG. 2, the audio signal 702(1) may be one example of the audio signal 202(1) and the audio signal 702(2) may be one example of the audio signal 202(2). In some implementations, a delay 701 may be applied to the audio signal 702(1).

In some other implementations, a delay may be applied to the audio signal 702(2) rather than the audio signal 702(1). Still further, in some implementations, no delay may be applied to any of the audio signals 702(1) or 702(2). In some implementations, each of the audio signals 702(1) and 702(2) may be processed via a QMF filter which splits each audio signal into at least 2 sub-bands (not shown for simplicity). In such implementations, the speaker focus system 700 may process each of the sub-band individually (as separate input audio signal).

The speaker focus system 700 includes an adaptive filter 710, a feature extractor 720, and a GMM classifier 730. The adaptive filter 710 is configured to determine an ReIR 704 between the microphones based on the received audio signals 702(1) and 702(2). Example suitable adaptive filtering techniques include frequency-domain NLMS, time-domain NLMS, affine projection, and recursive LMS, among other examples.

In some implementations, the adaptive filter 310 may determine the ReIR 704 based on a frequency-domain NLMS filter. For example, the adaptive filter 710 may convert each frame of the audio signals 702(1) and 702(2) from the time domain to the frequency domain (such as by using an FFT) and determine an NLMS filter that matches a frame of the audio signal 702(1) to a respective frame of the audio signal 702(2). The resulting NLMS filter is a mechanical-acoustical transfer function that represents the ReIR 704 (when converted to the time domain) between the microphones with respect to a source of the audio signals 702(1) and 702(2).

The feature extractor 720 is configured to extract a set of features 706 from the ReIR 704 based, at least in part, on a location of the peak of the ReIR 704. For example, the location of the peak of the ReIR 704 may be aligned with the timing of the delay 701. In some implementations, the delay 701 may be equal to one quarter of the NLMS filter size. In some aspects, the feature extractor 720 may determine the set of features 706 based on one or more statistical properties of the ReIR 704. Example suitable statistical properties include a kurtosis of the ReIR 704, an RMS of the ReIR 704, and a skew or level of the ReIR 704, among other examples.

In some implementations, the feature extractor 720 may include a tail kurtosis component 722. The tail kurtosis component 722 is configured to determine a kurtosis of a tail portion of the ReIR 704 (such as described with reference to FIG. 3). For example, the kurtosis of a random variable (X) is defined in Equation 1. The tail portion of the ReIR 704 spans a threshold duration starting from the peak of the ReIR 704. In some implementations, the tail portion of the ReIR 704 may include the remainder of the ReIR 704 (from the peak of the ReIR 704 to the end of the ReIR 704).

In some implementations, the feature extractor 720 may include a normalized pre-ring component 724. The normalized pre-ring component 724 is configured to determine an RMS of a pre-ring portion of the ReIR 704 normalized with respect to the peak of the ReIR 704 (such as described with reference to FIG. 3). For example, the RMS of a waveform (f(t)) defined over an interval $T_1 \leq t \leq T_2$ is shown in Equation 2. The pre-ring portion of the ReIR 704 spans a threshold duration ending at (or just before) the peak of the ReIR 704. In some implementations, the pre-ring portion of the ReIR 704 may span a portion of the ReIR 704 from the beginning of the ReIR 704 to one or more samples (such as 5) before the peak of the ReIR 704.

The set of features 706 may include the tail kurtosis of the ReIR 704, the normalized pre-ring of the ReIR 704, or any combination thereof. In some implementations, the set of features 706 may include other statistical properties of the ReIR 704 (not shown for simplicity). Example suitable statistical properties may include, among other examples, the skew or level of the entirety of the ReIR 704 or the skew or level of a particular portion of the ReIR 704 (such as the pre-ring portion or the tail of the ReIR 704).

The GMM classifier 730 is configured to determine the source classification 708 based on the set of features 706. More specifically, the GMM classifier 730 may classify the set of features 706 based on a trained GMM 707. In some implementations, the trained GMM 707 may be one example of the GMM 308 of FIG. 3. For example, the GMM classifier 730 may determine a likelihood or probability that the set of features 706 maps to a target cluster (such as the target cluster 610 of FIG. 6) and a likelihood or probability that the set of features 706 maps to a distractor cluster (such as the distractor cluster 620 of FIG. 6) associated with the trained GMM 707.

In some implementations, the GMM classifier 730 may select the cluster having the highest probability as the source classification 708. In other words, the source classification 708 may indicate whether the set of features 706 is more likely to be associated with the target cluster or the distractor cluster. In some implementations, where the set of features 706 has the same likelihood of mapping to either the target cluster or the distractor cluster, the GMM classifier 730 may select the target cluster as the source classification 708 (such as to avoid mistakenly suppressing target speech).

As described with reference to FIG. 2, the source classification 708 may be used by a speech enhancement component (such as the speech enhancement component 230) to improve the quality of speech in an audio signal. For example, the speech enhancement component may apply a higher gain to pass-through or amplify a given frame of the audio signal when the source classification 708 indicates the target cluster. On the other hand, the speech enhancement component may apply a lower gain to suppress or attenuate a given frame of the audio signal when the source classification 708 indicates the distractor cluster.

Figure 8A:
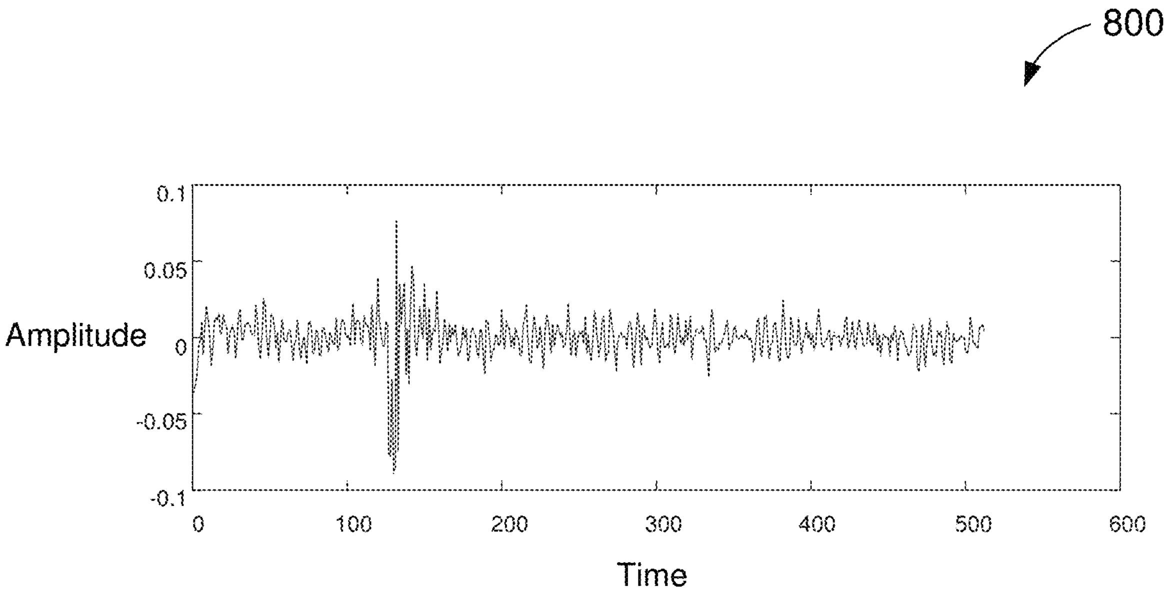
FIG. 8A shows another timing diagram depicting an example ReIR between a pair of microphones.

FIG. 8A shows another timing diagram depicting an example ReIR 800 between a pair of microphones. In some implementations, the ReIR 800 may be produced by an adaptive filter (such as the adaptive filter 710 of FIG. 7) based on a pair of audio signals received via the pair of microphones, respectively. In the example of FIG. 8A, the amplitude of the ReIR 800 is depicted over time (T). More specifically, the ReIR 800 spans a duration from times T=0 to T=510 and has a peak that occurs around time T=135. As shown in FIG. 8A, the tail portion of the ReIR 800 (such as from times T=135 to T=510) is very noisy and the pre-ring portion of the ReIR 800 (such as from times T=0 to T=135) exhibits significant ringing. As such, the ReIR 800 may have a relatively low tail kurtosis and a relatively high normalized pre-ring. As described with reference to FIG. 5, low tail kurtosis and high normalized pre-ring may indicate that the ReIR 800 is likely to originate from a distractor source.

Figure 8B:
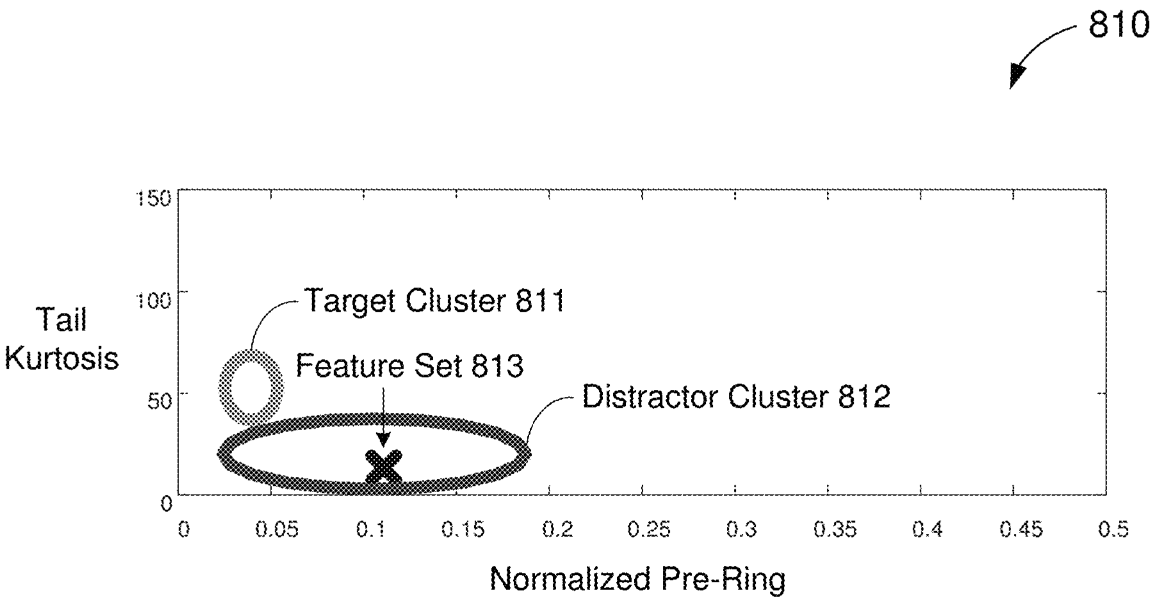
FIG. 8B shows an example mapping of a set of features extracted from the ReIR of FIG. 8A to a trained GMM.

FIG. 8B shows an example mapping 810 of a set of features 813 extracted from the ReIR 800 of FIG. 8A to a trained GMM. More specifically, the set of features 813 includes a tail kurtosis of the ReIR 800 (mapped along the vertical axis) and a normalized pre-ring of the ReIR 800 (mapped along the horizontal axis). In some implementations, the mapping 810 may be performed by a GMM classifier (such as the GMM classifier 730 of FIG. 7). With reference for example to FIG. 7, the trained GMM may be one example of the trained GMM 707. In the example of FIG. 8B, the trained GMM is depicted as a pair of ellipsoids 811 and 812 representing a target cluster and a distractor cluster, respectively. As shown in FIG. 8B, the location of the feature set 813 is bounded by the ellipsoid 812 representing the distractor cluster. Thus, in some implementations, the GMM classifier may classify the set of features 813 as belonging to (or mapping to) the distractor cluster 812.

Figure 9:
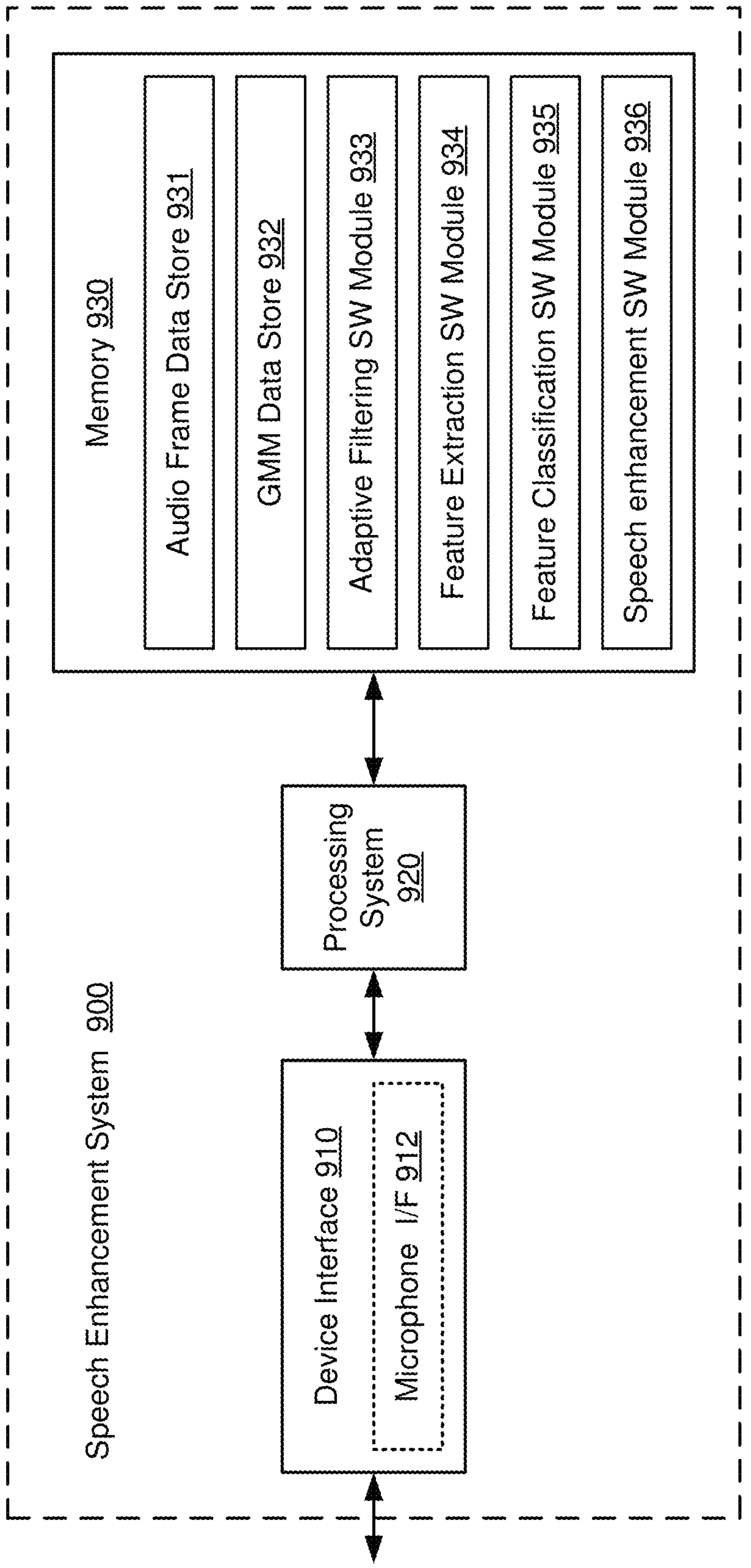
FIG. 9 shows another block diagram of an example speech enhancement system, according to some implementations.

FIG. 9 shows another block diagram of an example speech enhancement system 900, according to some implementations. More specifically, the speech enhancement system 900 may be configured to receive a multi-channel audio signal and produce an enhanced audio signal by filtering or suppressing noise in the received audio signal. In some implementations, the speech enhancement system 900 may be one example of the audio receiver 200 of FIG. 2.

The speech enhancement system 900 includes a device interface 910, a processing system 920, and a memory 930. The device interface 910 is configured to communicate with various components of the audio receiver (such as the microphones 201(1) and 210(2) of FIG. 2). In some implementations, the device interface 910 may include a microphone interface (I/F) 912 configured to receive the multi-channel audio signal via a plurality of microphones. For example, the microphone interface 912 may sample or receive individual frames of the audio signal at a frame hop associated with the speech enhancement system 900. The frame hop may represent a frequency at which an application requires or otherwise expects to receive enhanced audio frames from the speech enhancement system 900.

The memory 930 may include an audio frame data store 931 and a GMM data store 932. The audio frame data store 931 is configured to store one or more frames of the multi-channel audio signal as well as any intermediate information that may be produced by the speech enhancement system 900 as a result of performing the speech enhancement operation (such as ReIRs or various features extracted from the ReIRs). The GMM data store 932 is configured to store a trained GMM (such as the GMM 308 of FIG. 3 or the trained GMM 707 of FIG. 7) that can be used for feature classification.

The memory 930 also may include a non-transitory computer-readable medium (including one or more nonvolatile memory elements, such as EPROM, EEPROM, Flash memory, or a hard drive, among other examples) that may store at least the following software (SW) modules:

- an adaptive filtering SW module 933 to determine a relative impulse response between the plurality of microphones based on a frame of the multi-channel audio signal;
- a feature extraction SW module 934 to extract a set of features from the relative impulse response based at least in part on a peak of the relative impulse response;
- a feature classification SW module 935 to classify the set of features based on the trained GMM; and
- a speech enhancement SW module 936 to process at least a first channel of the multi-channel audio signal based at least in part on the classification for the set of features.

Each software module includes instructions that, when executed by the processing system 920, causes the speech enhancement system 900 to perform the corresponding functions.

The processing system 920 may include any suitable one or more processors capable of executing scripts or instructions of one or more software programs stored in the speech enhancement system 900 (such as in the memory 930). For example, the processing system 920 may execute the adaptive filtering SW module 933 to determine a relative impulse response between the plurality of microphones based on a frame of the multi-channel audio signal. The processing system 920 also may execute the feature extraction SW module 934 to extract a set of features from the relative impulse response based at least in part on a peak of the relative impulse response. Further, the processing system 920 may execute the feature classification SW module 935 to classify the set of features based on the trained GMM. Still further, the processing system 920 may execute the speech enhancement SW module 936 to process at least a first channel of the multi-channel audio signal based at least in part on the classification for the set of features.

Figure 10:
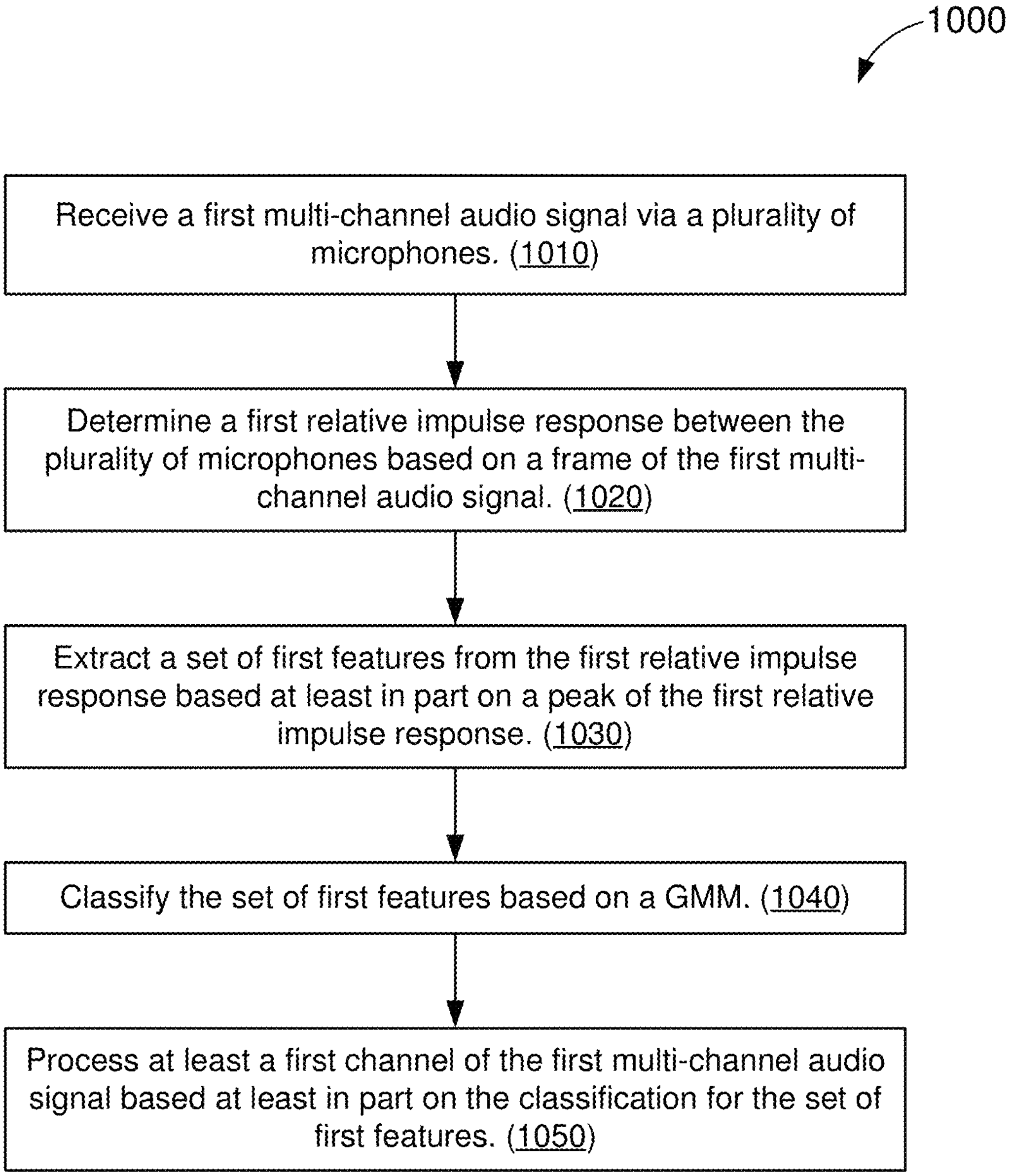
FIG. 10 shows an illustrative flowchart depicting an example operation for processing audio signals, according to some implementations.

FIG. 10 shows an illustrative flowchart depicting an example operation 1000 for processing audio signals, according to some implementations. In some implementations, the example operation 1000 may be performed by a speech enhancement system (such as the audio receiver 200 of FIG. 2 or the speech enhancement system 900 of FIG. 9).

The speech enhancement system receives a first multi-channel audio signal via a plurality of microphones (1010). The speech enhancement system determines a first relative impulse response between the plurality of microphones based on a frame of the first multi-channel audio signal (1020). The speech enhancement system extracts a set of first features from the first relative impulse response based at least in part on a peak of the first relative impulse response (1030). The speech enhancement system classifies the set of first features based on a GMM (1040). Further, the speech enhancement system processes at least a first channel of the first multi-channel audio signal based at least in part on the classification for the set of first features (1050).

In some implementations, the first relative impulse response may be determined based on an NLMS filter. In some implementations, the set of first features may include a kurtosis of a tail portion of the first relative impulse response, where the tail portion spans a threshold duration starting from the peak. In some other implementations, the set of first features may include an RMS of a pre-ring portion of the first relative impulse response normalized with respect to the peak, where the pre-ring portion spans a threshold duration ending at the peak.

In some aspects, the speech enhancement system may further receive a second multi-channel audio signal via the plurality of microphones; determine a second relative impulse response between the plurality of microphones based on a frame of the second multi-channel audio signal; extract a set of second features from the second relative impulse response based at least in part on a peak of the second relative impulse response; and train the GMM based at least in part on the set of second features. In some implementations, the first multi-channel audio signal and the second multi-channel audio signal may carry speech from the same user.

In some aspects, the GMM may be trained to determine two non-covariate clusters including a target cluster and a distractor cluster. In some implementations, the classifying of the set of first features may include mapping the set of first features to one of the target cluster or the distractor cluster. In some implementations, the processing of the first channel of the multi-channel audio signal may include adjusting a gain associated with the first channel based on whether the set of first features are mapped to the target cluster or the distractor cluster. In some implementations, the adjusting of the gain may result in greater attenuation of the first channel when the set of first features are mapped to the distractor cluster than when the set of first features are mapped to the target cluster.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of speech enhancement, the method performed by one or more processors of a speech enhancement system and comprising:
- receiving a first multi-channel audio signal via a plurality of microphones;
- determining a first relative impulse response between the plurality of microphones based on a frame of the first multi-channel audio signal;
- extracting a set of first features from the first relative impulse response based at least in part on a peak of the first relative impulse response, wherein the set of first features includes a root mean square (RMS) of a pre-ring portion of the first relative impulse response normalized with respect to the peak, the pre-ring portion spanning a threshold duration ending at the peak; and
- training a Gaussian mixture model (GMM) to determine two non-covariate clusters including a target cluster and a distractor cluster, the target cluster associated with a target source of audio signals and the distractor cluster associated with a distractor source of audio signals, wherein the set of first features is classified as belonging to the target cluster or to the distractor cluster based at least in part on the normalized RMS of the pre-ring portion of the first relative impulse response, wherein the target cluster is associated with smaller values of the normalized RMS of the pre-ring portion as compared with the distractor cluster.

2. The method of claim 1, wherein the first relative impulse response is determined based on a normalized least mean squares (NLMS) filter.

3. The method of claim 1, wherein the set of first features includes a kurtosis of a tail portion of the first relative impulse response, the tail portion spanning a threshold duration starting from the peak.

4. The method of claim 1, further comprising:
- receiving a second multi-channel audio signal via the plurality of microphones;
- determining a second relative impulse response between the plurality of microphones based on a frame of the second multi-channel audio signal;
- extracting a set of second features from the second relative impulse response based at least in part on a peak of the second relative impulse response;
- classifying the set of second features based on the trained GMM; and
- adjusting a gain associated with at least a first channel of the first multi-channel audio signal based on whether the set of second features is mapped to the target cluster or the distractor cluster.

5. The method of claim 4, wherein the first multi-channel audio signal and the second multi-channel audio signal carry speech from the same user.

6. The method of claim 4, wherein the adjusting of the gain results in greater attenuation of the first channel when the set of second features are mapped to the distractor cluster than when the set of second features are mapped to the target cluster.

7. A speech enhancement system comprising:
- a processing system; and
- a memory storing instructions that, when executed by the processing system, causes the speech enhancement system to:
  - receive a first multi-channel audio signal via a plurality of microphones;
  - determine a first relative impulse response between the plurality of microphones based on a frame of the first multi-channel audio signal;
  - extract a set of first features from the first relative impulse response based at least in part on a peak of the first relative impulse response, wherein the set of first features includes a root mean square (RMS) of a pre-ring portion of the first relative impulse response normalized with respect to the peak, the pre-ring portion spanning a threshold duration ending at the peak; and
  - train a Gaussian mixture model (GMM) to determine two non-covariate clusters including a target cluster and a distractor cluster, the target cluster associated with a target source of audio signals and the distractor cluster associated with a distractor source of audio signals, wherein the set of first features is classified as belonging to the target cluster or to the distractor cluster based at least in part on the normalized RMS of the pre-ring portion of the first relative impulse response, wherein the target cluster is associated with smaller values of the normalized RMS of the pre-ring portion as compared with the distractor cluster.

8. The speech enhancement system of claim 7, wherein the plurality of microphones comprises a handset microphone of a telephonic communication device and a handsfree microphone of the telephonic communication device.

9. The speech enhancement system of claim 8, wherein the first multi-channel audio signal is received while the telephonic communication device operates in a handsfree communication mode.

10. The speech enhancement system of claim 7, wherein the first relative impulse response is determined based on a normalized least mean squares (NLMS) filter.

11. The speech enhancement system of claim 7, wherein the set of first features includes a kurtosis of a tail portion of the first relative impulse response, the tail portion spanning a threshold duration starting from the peak.

12. The speech enhancement system of claim 7, wherein execution of the instructions further causes the speech enhancement system to:

receive a second multi-channel audio signal via the plurality of microphones;

determine a second relative impulse response between the plurality of microphones based on a frame of the second multi-channel audio signal;

extract a set of second features from the second relative impulse response based at least in part on a peak of the second relative impulse response;

classify the set of second features based on the trained GMM; and adjust a gain associated with at least a first channel of the first multi-channel audio signal based on whether the set of second features is mapped to the target cluster or the distractor cluster.

13. The speech enhancement system of claim 12, wherein the first multi-channel audio signal and the second multi-channel audio signal carry speech from the same user.

* * * * *